March 4, 1958      A. N. JACOBSON      2,825,171
FISH LURE
Filed April 1, 1955
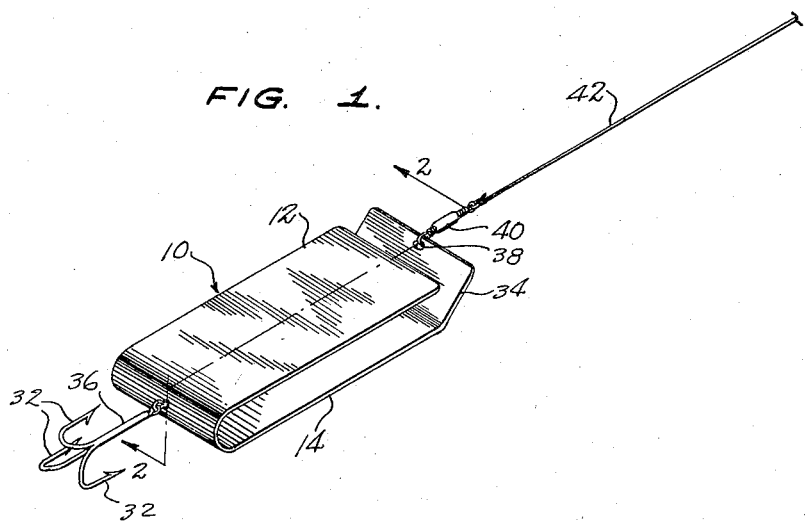
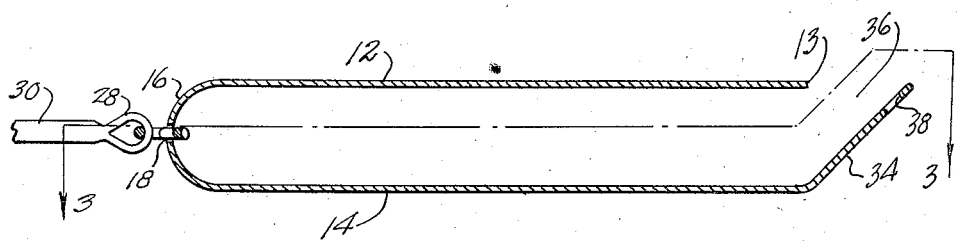
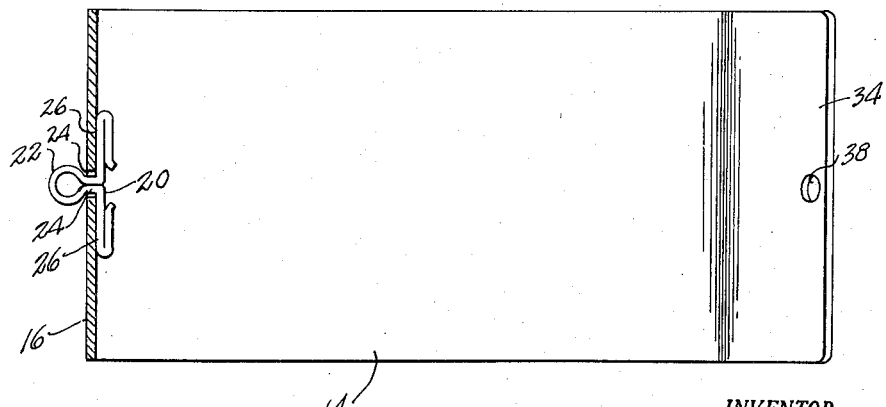
INVENTOR.
ARNOLD N. JACOBSON,
BY
McMorrow, Berman + Davidson
ATTORNEYS.

United States Patent Office 2,825,171
Patented Mar. 4, 1958

2,825,171

FISH LURE

Arnold N. Jacobson, Sheridan, Wyo., assignor of one-tenth to Gadget-Of-The-Month Club, Inc., Los Angeles, Calif., a corporation of California Application April 1, 1955, Serial No. 498,633

2 Claims. (Cl. 43—42.5)

This invention relates to an improved fish lure of the spinner type.

It is the primary object of this invention to provide a fish lure of new and novel design, which, when drawn through the water, performs erratic spinning movements which attract and cause fish to strike at the lure.

Another object of the invention is to provide a fish lure having large light reflecting surfaces so arranged as to give the illusion, when the device is in operation, of a large and attractive minnow.

Yet another object is to provide an improved fish lure of simple and economical construction, which can be made from a single piece of sheet material which is readily formed into the desired shape.

Other objects and advantages will become apparent from a consideration of the following detailed description, forming the specification, and taken in conjunction with the accompanying drawing, in which:

Figure 1 is a perspective view of a fish lure embodying this invention as it appears secured to a fishing line and carrying a fish hook;

Figure 2 is a vertical longitudinal cross sectional view, on an enlarged scale, taken along line 2—2 of Figure 1 with the fishing line and connecting swivel omitted; and Figure 3 is a horizontal cross sectional view taken substantially along line 3—3 of Figure 2.

With continued reference to the drawings, the illustrated fish lure comprises an elongated reclining U-shaped body 10. The body 10 is formed of a single piece of sheet material, preferably metal.

The body 10 comprises flat plane, parallel, elongated rectangular upper and lower plates 12 and 14 of the same size and shape, joined together at their rear ends by an arcuate bight portion 16. The bight portion 16 is provided with a central opening 18. An attaching member 20 engaging the forward side of the bight portion 16 has intermediate its ends shank portions 24 engaged in the opening 18 and terminating in an eye 22 positioned rearwardly of the bight portion 16. The member 20 includes lateral arms 26 extending laterally from the shank portions 24 and contacting the forward side of the bight portion 16.

The eye 28 on the forward end of a trailing fish hook 30 is engaged within the eye 22. The fish hook is provided with a plurality of barbs 32 projecting from the rear end thereof.

The lower plate 14 has on its forward end a short forwardly inclined extension 34 whose elevated forward edge is substantially in the plane of the upper plate 12 and spaced forwardly from the forward edge 13 of the upper plate 12. Thus, there is defined between the forward edge 13 of the upper plate 12 and the extension 34 a rearwardly declining passage 36 communicating with the space between the plates 12 and 14.

An opening 38 is provided in the extension 34 adjacent its free edge and intermediate its ends for the reception therein of an attaching swivel 40 for a fishing line 42.

It will be noted that the width of the plates 12 and 14, bight portion 16 and extension 34 are substantially the same.

Due to its design and construction, the lure 10 will rotate about the swivel 40 as the lure is drawn forwardly through the water due to the stream of water entering the passage 36 and flowing laterally outwardly from the body 10 adjacent the bight portion 16 at a rate proportionate to the speed at which the lure is drawn through the water.

While there is shown and described the preferred embodiment of the invention, it is to be understood that the structure is susceptible to change and modification within the practicability of the invention and the invention is limited only by the scope of the claims appended hereto.

What is claimed is:

1. In a spinning lure, a reclining U-shaped body of sheet material comprising similar plane flat rectangular upper and lower plates, said plates being of the same size and shape and being spaced parallel from each other, a bight portion joining the plates, hook attaching means on said bight portion, a forwardly inclined flat rectangular extension on the lower plate having a free forward elevated edge, and fishing line attaching means on said extension adjacent its free forward edge.

2. In a spinning lure, a reclining U-shaped body of sheet material comprising similar plane flat rectangular upper and lower plates, said plates being of the same size and shape and being spaced parallel from each other, a bight portion joining the plates, hook attaching means on said bight portion, said upper plate having a free forward edge, a forwardly inclined flat rectangular extension on the lower plate having a free forward elevated edge, and fishing line attaching means on said extension adjacent its free forward edge, said elevated free forward edge of the extension being substantially in the plane of said upper plate and being spaced forwardly from the forward edge of the upper plate.

References Cited in the file of this patent

UNITED STATES PATENTS

| | | |
|---|---|---|
| 1,070,683 | Hale | Aug. 19, 1913 |
| 1,080,999 | Rosenfeld | Dec. 9, 1913 |
| 1,362,586 | Ackerman | Dec. 21, 1920 |
| 1,589,228 | Robb | June 15, 1926 |
| 1,698,502 | Klin | Jan. 8, 1929 |
| 2,719,378 | Salm | Oct. 4, 1955 |

FOREIGN PATENTS

| | | |
|---|---|---|
| 218,089 | Switzerland | Mar. 2, 1942 |